(12) United States Patent
Nansaka et al.

(10) Patent No.: US 9,202,637 B2
(45) Date of Patent: Dec. 1, 2015

(54) LITHIUM ION CAPACITOR

(75) Inventors: Kenji Nansaka, Kofu (JP); Makoto Taguchi, Kai (JP)

(73) Assignee: JM Energy Corporation, Hokuto (JP)

( * ) Notice: Subject to any disclaimer, the term of this patent is extended or adjusted under 35 U.S.C. 154(b) by 49 days.

(21) Appl. No.: 13/879,919

(22) PCT Filed: Jun. 28, 2011

(86) PCT No.: PCT/JP2011/064773
§ 371 (c)(1),
(2), (4) Date: Apr. 17, 2013

(87) PCT Pub. No.: WO2012/053256
PCT Pub. Date: Apr. 26, 2012

(65) Prior Publication Data
US 2013/0201606 A1    Aug. 8, 2013

(30) Foreign Application Priority Data

Oct. 19, 2010   (JP) ................................ 2010-234276

(51) Int. Cl.
*H01G 11/06*   (2013.01)
*H01G 11/52*   (2013.01)
(Continued)

(52) U.S. Cl.
CPC ............... *H01G 11/06* (2013.01); *H01G 11/26* (2013.01); *H01G 11/50* (2013.01); *H01G 11/52* (2013.01); *Y02E 60/13* (2013.01)

(58) Field of Classification Search
CPC ....... H01G 11/06; H01G 11/50; H01G 11/26; H01G 11/52; Y02E 60/13
USPC .................................................. 361/517, 502
See application file for complete search history.

(56) References Cited

U.S. PATENT DOCUMENTS 5,862,035 A * 1/1999 Farahmandi et al. ......... 361/502
6,830,594 B2 * 12/2004 Shinozaki et al. ........... 29/25.03
(Continued)

FOREIGN PATENT DOCUMENTS

CN       1855327 A     11/2006
CN    101517774 A      8/2009
(Continued)

OTHER PUBLICATIONS

International Search Report Issued Sep. 20, 2011 in PCT/JP11/64773 Filed Jun. 28, 2011.
(Continued)

*Primary Examiner* — Jeremy C Norris
*Assistant Examiner* — Nathan Milakovich
(74) *Attorney, Agent, or Firm* — Oblon, McClelland, Maier & Neustadt, L.L.P.

(57) ABSTRACT

The present invention has as its object the provision of a lithium ion capacitor having high capacity and high output characteristics and also having high safety that allows suppression of an increase in surface temperature even when an internal short circuit accidentally occurs.
The lithium ion capacitor of the present invention comprises: a lithium ion capacitor element formed by overlaying a positive electrode sheet and a negative electrode sheet on top of one another with a separator interposed therebetween; an electrolyte solution; and an outer container that contains the lithium ion capacitor element and the electrolyte solution, a porous layer is formed on an outer surface of the lithium ion capacitor element, and the lithium ion capacitor satisfies following relational expressions (1) and (2):

$35 \leq T \times R/C$         relational expression (1):

$0.01 \leq R/C \leq 5$         relational expression (2):

where C is a capacitance [kF] of the lithium ion capacitor, R is a direct current resistance value [mΩ] of the lithium ion capacitor, and T is a thickness [μm] of the porous layer.

8 Claims, 5 Drawing Sheets

(51) Int. Cl.
*H01G 11/50* (2013.01)
*H01G 11/26* (2013.01)

(56) References Cited

U.S. PATENT DOCUMENTS

| | | | |
|---|---|---|---|
| 7,236,348 B2 * | 6/2007 | Asano et al. | 361/502 |
| 7,974,074 B2 * | 7/2011 | Nanba et al. | 361/502 |
| 8,889,284 B2 * | 11/2014 | Busch et al. | 429/144 |
| 2006/0238957 A1 * | 10/2006 | Mitsuda et al. | 361/502 |
| 2007/0002525 A1 * | 1/2007 | Yamanoi et al. | 361/508 |
| 2007/0053141 A1 * | 3/2007 | Fujino | 361/502 |
| 2008/0026288 A1 * | 1/2008 | Marple et al. | 429/178 |
| 2008/0241684 A1 * | 10/2008 | Muraoka et al. | 429/209 |
| 2008/0304852 A1 * | 12/2008 | Kishi | 399/88 |
| 2009/0097189 A1 * | 4/2009 | Tasaki et al. | 361/512 |
| 2009/0136832 A1 * | 5/2009 | Mitsuda et al. | 429/94 |
| 2009/0154064 A1 * | 6/2009 | Tasaki et al. | 361/505 |
| 2009/0161296 A1 * | 6/2009 | Matsui et al. | 361/505 |
| 2009/0246626 A1 * | 10/2009 | Tasaki et al. | 429/208 |
| 2011/0256438 A1 * | 10/2011 | Taguchi et al. | 429/94 |
| 2013/0335885 A1 * | 12/2013 | Ginatulin et al. | 361/511 |

FOREIGN PATENT DOCUMENTS

| | | | |
|---|---|---|---|
| JP | 2006 303224 | | 11/2006 |
| JP | 2007067105 A | * | 3/2007 |
| JP | 2008 304864 | | 12/2008 |
| JP | 2010 232574 | | 10/2010 |

OTHER PUBLICATIONS

Combined Taiwanese Office Action and Search Report issued May 18, 2015 in Patent Application No. 100125636 (with English language translation).

Office Action issued Jun. 15, 2015, in Chinese Application No. 201180050629.1 (with English Translation).

* cited by examiner

LITHIUM ION CAPACITOR

This application is a 35 U.S.C. §371 application of PCT/JP2011/064773, filed Jun. 28, 2011. Priority to Japanese patent application 2010-234276, filed Oct. 19, 2010, is claimed.

TECHNICAL FIELD

The present invention relates to a lithium ion capacitor.

BACKGROUND ART

In various fields such as power devices, wind power generators, and uninterruptible power supplies, a lithium ion capacitor including an outer container containing a lithium ion capacitor element and an electrolyte solution is recently receiving attention as an accumulator device having high energy density and high output characteristics (see, for example, Patent Literature 1). Particularly, studies on vehicle-mounting applications that require high output power are progressing, and high safety performance is strongly required by the market.

One problem particularly in a power application is that when, for example, an accident occurs, an internal short circuit may occur in a lithium ion capacitor due to deformation (folding) of the lithium ion capacitor caused by pressure from the outside or due to sticking of a sharp object into the lithium ion capacitor.

Therefore, in a lithium ion capacitor proposed to solve such a problem, a polyethylene-made plate of about 500 μm is disposed between the outer container and the lithium ion capacitor element, and the deformation due to the external pressure is thereby suppressed to improve durability (see, for example, Patent Literature 2).

However, the lithium ion capacitor configured as above has small capacitance and large resistance. Therefore, although safety can be achieved, the lithium ion capacitor does not have performance, such as high output power and high capacity, required by the market.

In a lithium ion capacitor having high energy density and high output characteristics, a large current flows when an internal short circuit occurs, causing abrupt heat generation. Therefore, there is a high possibility that the surface temperature of the lithium ion capacitor becomes high (150° C. or higher), so that, for example, a component of the lithium ion capacitor may melt. In a device (module) including a plurality of lithium ion capacitors, the influence of the heat may be exerted on a lithium ion capacitor adjacent to the lithium ion capacitor with high surface temperature, and the desired function may not be achieved.

CITATION LIST

Patent Literature

Patent Literature 1: Japanese Patent Application Laid-Open No. 2007-67105
Patent Literature 2: Japanese Patent Application Laid-Open No. 2008-244378

SUMMARY OF INVENTION

Technical Problem

The present invention has been made on the basis of the foregoing circumstances and has as its object the provision of a lithium ion capacitor having high capacity and high output characteristics and also having high safety that allows suppression of an increase in surface temperature even when an internal short circuit accidentally occurs.

Solution to Problem

The lithium ion capacitor of the present invention comprises: a lithium ion capacitor element formed by overlaying a positive electrode sheet and a negative electrode sheet on top of one another with a separator interposed therebetween; an electrolyte solution; and an outer container that contains the lithium ion capacitor element and the electrolyte solution, wherein
a porous layer is formed on an outer surface of the lithium ion capacitor element, and
the lithium ion capacitor satisfies following relational expressions (1) and (2):

$$35 \leq T \times R/C \qquad \text{relational expression (1):}$$

$$0.01 \leq R/C \leq 5 \qquad \text{relational expression (2):}$$

where C is a capacitance [kF] of the lithium ion capacitor, R is a direct current resistance value [mΩ] of the lithium ion capacitor, and T is a thickness [μm] of the porous layer.

In the lithium ion capacitor of the present invention, the porous layer may preferably be formed by overlaying porous sheets.

In the lithium ion capacitor of the present invention, the porous layer and the separator may preferably be formed from a single member.

In the lithium ion capacitor of the present invention, the porous layer may preferably be formed of at least one selected from among cellulose, rayon, polyethylene, and polypropylene.

In the lithium ion capacitor of the present invention, the porous layer may preferably have a thickness of not smaller than 120 μm.

Advantageous Effects of Invention

In the lithium ion capacitor of the present invention, the porous layer is formed on the outer surface of the lithium ion capacitor element, and the thickness of the porous layer is determined by the relation between the capacitance and direct current resistance value of the lithium ion capacitor. Therefore, even when an internal short circuit accidentally occurs, the thermal energy of abrupt heat generation caused by a large flow of electric current is absorbed by the electrolyte solution with which the porous layer is impregnated. This can suppress an increase in surface temperature. In addition, a reduction in the capacitance of the lithium ion capacitor and an increase in its resistance due to the provision of the porous layer can be suppressed.

Therefore, in the lithium ion capacitor of the present invention, high capacity and high output characteristics are achieved. In addition, when an internal short circuit occurs, an increase in the surface temperature is suppressed, and high safety is thereby achieved.

DESCRIPTION OF EMBODIMENTS

Embodiments of the present invention in which the lithium ion capacitor of the present invention is embodied as a wound-type lithium ion capacitor (hereinafter abbreviated as a "wound-type LIC") will next be described in detail.

Figure 1:
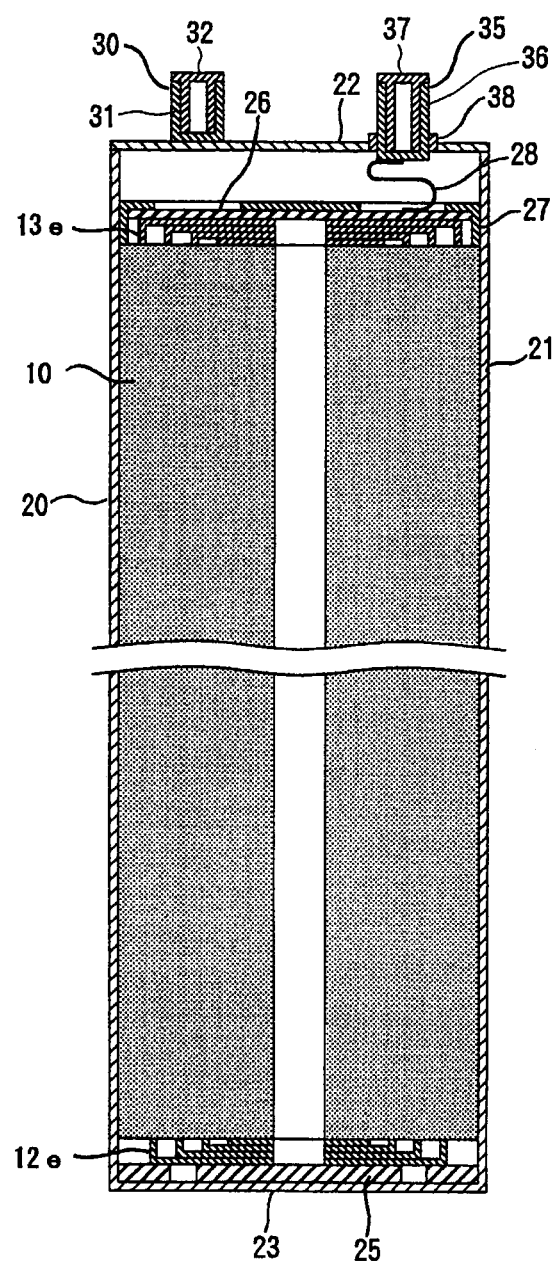
FIG. 1 is an explanatory cross-sectional view illustrating an example of the configuration of the lithium ion capacitor of the present invention.
Figure 2:
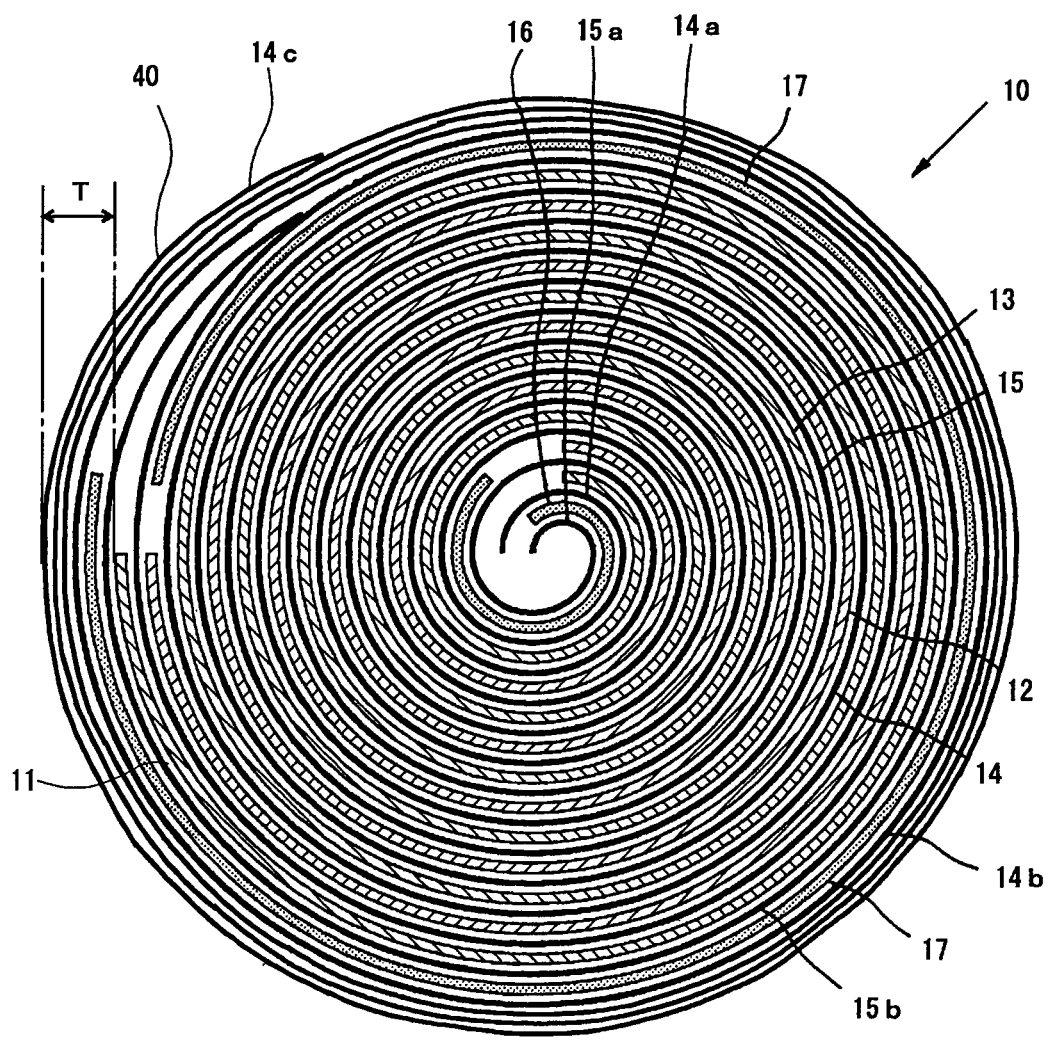
FIG. 2 is an explanatory cross-sectional view illustrating the configuration of a lithium ion capacitor element making up the lithium ion capacitor in FIG. 1 and having a porous layer formed on the outer surface thereof.
Figure 3:
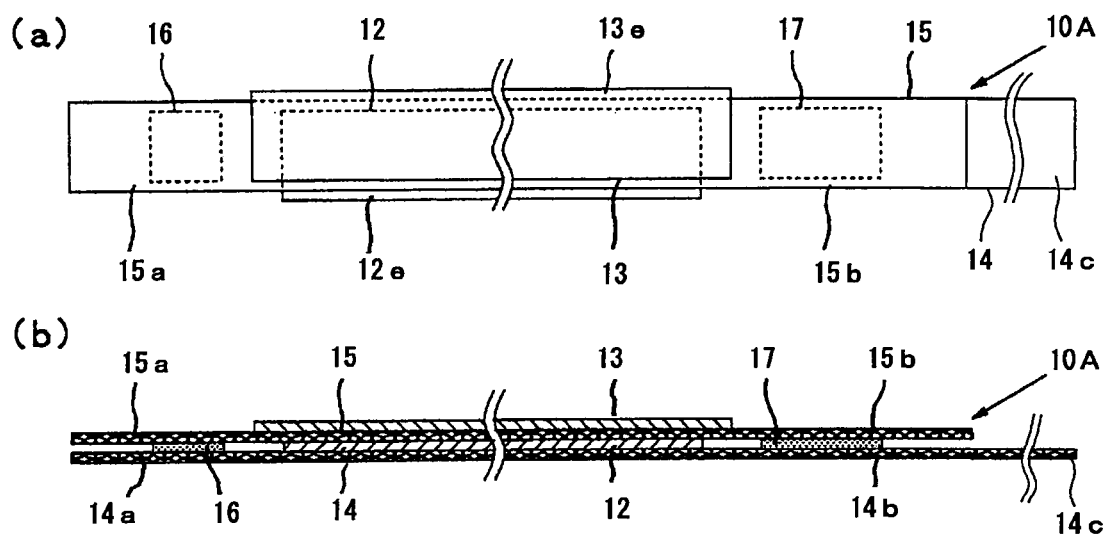
FIG. 3 is a set of explanatory diagrams illustrating an electrode stack that forms the lithium ion capacitor element and porous layer in FIG. 2, FIG. 3(a) being a plan view, FIG. 3(b) being a cross-sectional view obtained by cutting the electrode stack in its longitudinal direction.

FIG. 1 is an explanatory cross-sectional view illustrating an example of the configuration of the lithium ion capacitor of the present invention, and FIG. 2 is an explanatory cross-sectional view illustrating the configuration of a lithium ion capacitor element making up the lithium ion capacitor in FIG. 1 and having a porous layer formed on the outer surface thereof. FIG. 3 is a set of explanatory diagrams illustrating an electrode stack that forms the lithium ion capacitor element and porous layer in FIG. 2, FIG. 3(a) being a plan view, FIG. 3(b) being a cross-sectional view obtained by cutting the electrode stack in its longitudinal direction.

This wound-type LIC has a structure in which an electrolyte solution and the cylindrical lithium ion capacitor element (hereinafter may be referred to as an "element") 11 formed by overlaying a positive electrode sheet 12 and a negative electrode sheet 13 on top of one another with separators interposed therebetween, specifically, formed by winding the positive electrode sheet 12 and the negative electrode sheet 13 with the separators interposed therebetween while overlaying them, are housed in a metal-made outer container 20.

In the present description, the lithium ion capacitor element is obtained by overlaying a positive electrode sheet and a negative electrode sheet on top of one another with a separator interposed therebetween. The lithium ion capacitor element formed by overlaying electrode sheets on top of one another has either the structure shown in FIG. 1 in which a stack of the positive electrode sheet 12 and the negative electrode sheet 13 with separators interposed therebetween is wound or a structure in which positive electrode sheets and negative electrode sheets are alternately stacked with separators therebetween.

A porous layer 40 is formed on the outer surface of the element 11. The porous layer 40 is interposed between the element 11 and the outer container 20.

Here, the outer surface of the element 11 means the outer surface of the outermost electrode sheet in the element 11.

In the example shown, the porous layer 40 is disposed along the outer circumferential surface of the outermost electrode sheet in the element 11 (i.e., the negative electrode sheet 13) so as to cover the outer surface of this electrode sheet, and the element 11 and the porous layer 40 form a capacitor element unit 10. The capacitor element unit 10 includes an element section composed of the element 11 and a porous layer section composed of the porous layer 40.

The wound-type LIC according to the present invention is required to satisfy following relational expressions (1) and (2). In these relational expressions, the capacitance of the lithium ion capacitor is denoted by C [kF], the direct current resistance value of the lithium ion capacitor is denoted by R [mΩ], and the thickness of the porous layer 40 is denoted by T [μm].

In the example shown, the thickness T of the porous layer 40 is the separation distance from the outer circumferential surface of the element 11, i.e., the outer surface of the outermost electrode sheet in the element 11 (the negative electrode sheet 13 in the example shown) to the outer surface of the capacitor element unit 10.

$$35 \leq T \times R/C \quad \text{relational expression (1):}$$

$$0.01 \leq R/C \leq 5 \quad \text{relational expression (2):}$$

Figure 8:
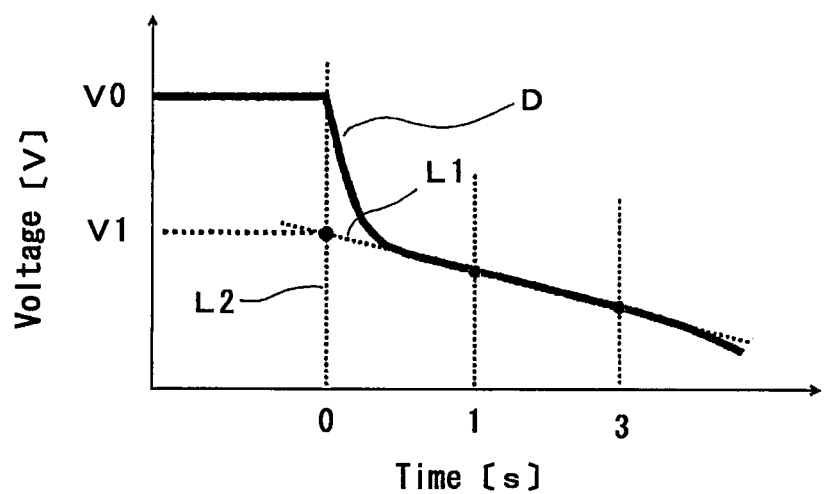
FIG. 8 is a graph showing the relation between the voltage and time of a discharge curve in capacitance measurement.

The "capacitance C of the lithium ion capacitor" is a value represented by a following formula (1). In the formula (1), Id [A] is a discharge current, td [s] is discharge time, and V2 [V] is a discharge cut-off voltage. V1 is determined from a graph shown in FIG. 8 showing the relation between the voltage and time of a discharge curve D. More specifically, V1 is a voltage value at the intersection of a straight line L2 when the time elapsed from the start of the discharge (which hereinafter may be referred to as "elapsed discharge time") is 0 [s], i.e., at the start of the discharge, and an approximate straight line L1 between a point at an elapsed discharge time of 1 [s] and a point at an elapsed discharge time of 3 [s] in the discharge curve D.

$$\text{capacitance } C \text{ [kF] of lithium ion capacitor} = (Id \times td)/[(V1-V2) \times 1000] \quad \text{Formula (1):}$$

The "direct current resistance value R of the lithium ion capacitor" is a value represented by a following formula (2). In the formula (2), V0 [V] is the voltage at the start of the discharge, and Id [A] is a discharge current. V1 is determined from the graph shown in FIG. 8 showing the relation between the voltage and time of the discharge curve D. More specifically, V1 is a voltage value at the intersection of the straight line L2 at an elapsed discharge time of 0 [s], i.e., at the start of the discharge, and the approximate straight line L1 between the point at an elapsed discharge time of 1 [s] and the point at an elapsed discharge time of 3 [s] in the discharge curve D.

$$\text{direct current resistance value } R \text{ [m}\Omega\text{] of lithium ion capacitor} = (V0-V1)/Id \times 1000 \quad \text{Formula (2):}$$

When the lithium ion capacitor satisfies the relational expressions (1) and (2), high capacity and high output characteristics are obtained, and high safety is achieved together with the above performance of the lithium ion capacitor.

The "T×R/C" in the relational expression (1) is a value indicating the relation between the performance and safety of the lithium ion capacitor.

The "T×R/C" is not lower than 35 and is preferably 35 to 1,000.

In the lithium ion capacitor, when the "T×R/C" is within the above range, the porous layer 40 can store the electrolyte solution in an amount sufficient to convert the heat generated by an internal short circuit to heat of vaporization so that the surface temperature can be maintained in a relatively low state. Therefore, an increase in the surface temperature due to the occurrence of an internal short circuit can be suppressed.

The "R/C" in the relational expression (2) is the ratio of the direct current resistance value R of the lithium ion capacitor to its capacitance C and is a value indicating the performance of the lithium ion capacitor. When the value of "R/C" is smaller, the lithium ion capacitor achieves higher performance.

In the lithium ion capacitor, when the "R/C" is within the above range, high performance, i.e., low resistance and high capacitance, can be obtained.

The thickness T of the porous layer 40 varies depending on the performance of the lithium ion capacitor, i.e., the capacitance C and direct current resistance value R of the lithium ion capacitor, and is generally not smaller than 120 µm, preferably not smaller than 120 µm, and smaller than 1,000 µm, for example.

Preferably, the porous layer 40 is formed from a porous sheet that is durable against the electrolyte solution, and a positive electrode active material, or a negative electrode active material, includes communication pores capable of being impregnated with the electrolyte solution, and has low electric conduction.

From the viewpoints of the ease of forming the porous layer 40 and the ease of controlling the thickness T, the porous layer 40 is preferably formed by overlaying porous sheets on top of one another, i.e., formed as a stack of the porous sheets.

Preferably, from the viewpoint of the ease of producing the capacitor element unit 10, the porous layer 40 and one of the separators included in the element 11 are a single member. More specifically, the porous layer 40 is preferably formed from a member having a separator-forming portion and a porous layer-forming portion.

In the example shown, one of the separators and the porous layer 40 are formed from a single member, i.e., a first porous sheet 14, and the porous layer 40 is a wound stack of the porous layer-forming portion of the first porous sheet 14, i.e., has a stacked structure formed by winding the porous layer-forming portion of the first porous sheet 14 around the outer circumferential surface of the element 11.

The porous sheet used to form the porous layer 40 may be any publicly known porous sheet and is preferably at least one selected from among cellulose (paper), rayon, polyethylene, and polypropylene. Of these, a mixture of cellulose and rayon, specifically, a cellulose/rayon mixed nonwoven fabric, is preferred in terms of durability and economy.

No particular limitation is imposed on the thickness of the porous sheet making up the porous layer 40. When the porous layer 40 is formed as a wound stack of the porous sheet, the thickness is generally preferably about 15 to about 50 µm.

The capacitor element unit 10 is formed by winding an electrode stack 10A cylindrically from one end. This electrode stack 10A is formed by stacking the positive electrode sheet 12, a band-shaped second porous sheet 15, and the negative electrode sheet 13 in that order on one surface of the band-shaped first porous sheet 14.

The positive electrode sheet 12 and the negative electrode sheet 13 are disposed such that an electrode layer 12b of the positive electrode sheet 12 faces an electrode layer 13b of the negative electrode sheet 13 (see FIGS. 5 and 6) through the second porous sheet 15.

In the example shown, the electrode stack 10A is wound such that the negative electrode sheet 13 is disposed inward. The first porous sheet 14 and the second porous sheet 15 are longer than the positive electrode sheet 12 and the negative electrode sheet 13. The first porous sheet 14 includes a separator-forming portion for forming a separator and a porous layer-forming portion for forming the porous layer 40 and is longer than the second porous sheet 15 for forming a separator. In the electrode stack 10A, the positive electrode sheet 12 is stacked on a one-end-side central section of the first porous sheet 14 that is a section of the first porous sheet 14 excluding a one-end section 14a of the separator-forming portion and a section extending from the other-end section of the separator-forming portion (hereinafter may be referred to as a "separator-end section") 14b to the other-end section 14c of the porous layer-forming portion. The negative electrode sheet 13 is stacked on a central section of the second porous sheet 15 that is a section of the second porous sheet 15 excluding a one-end section 15a and the other-end section 15b of the second porous sheet 15.

In the present invention, the "positive electrode" means an electrode from which an electric current flows during discharging and into which an electric current flows during charging, and the "negative electrode" means an electrode into which an electric current flows during discharging and from which an electric current flows during charging.

A lithium ion supply source 16 including film-like metallic lithium is disposed between the one-end section 14a of the first porous sheet 14 and the one-end section 15a of the second porous sheet 15. The lithium ion supply source 16 disposed is wound about one turn within the element section (the element 11) of the capacitor element unit 10 so as not to come into direct contact with the positive electrode sheet 12 and the negative electrode sheet 13. A lithium ion supply source 17 including film-like metallic lithium is disposed between the separator-end section 14b of the first porous sheet 14 and the other-end section 15b of the second porous sheet 15. The lithium ion supply source 17 disposed is wound about one turn within the porous layer section (the porous layer 40) of the capacitor element unit 10 so as not to come into direct contact with the positive electrode sheet 12 and the negative electrode sheet 13.

Figure 4:
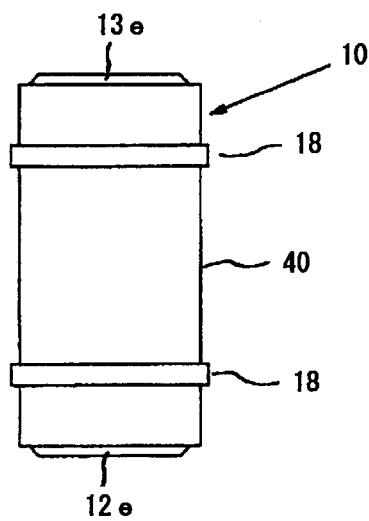
FIG. 4 is an explanatory diagram illustrating the appearance of the lithium ion capacitor element having the porous layer formed on its outer surface and shown in FIG. 2.

As shown in FIG. 4, two tapes 18 each having on one side an adhesive layer and used to hold the capacitor element unit 10 are provided on the outer circumferential surface of the capacitor element unit 10, i.e., on the outer surface of the other-end section 14c of the first porous sheet 14 that constitutes the porous layer 40.

By providing such tapes 18, the work of housing the capacitor element unit 10 in the outer container 20 is facilitated, and the workability of assembling the wound-type LIC can be improved.

Figure 5:
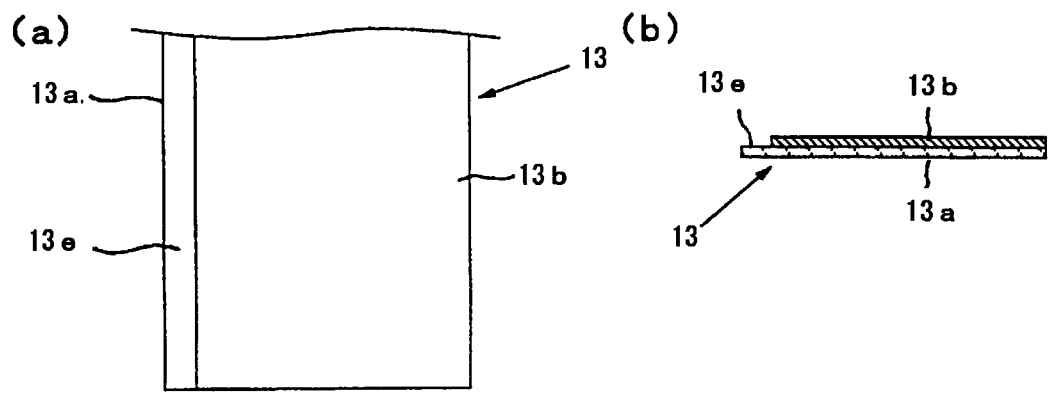
FIG. 5 is a set of enlarged explanatory diagrams illustrating part of a negative electrode sheet, FIG. 5(a) being a plan view, FIG. 5(b) being a cross-sectional view obtained by cutting the negative electrode sheet in its width direction.

As shown in FIG. 5, the negative electrode sheet 13 is obtained by forming an electrode layer 13b containing a negative electrode active material on at least one surface of a band-shaped negative electrode current collector 13a.

In the example shown, the electrode layer 13b is formed so as to cover the surface of the negative electrode current collector 13a except for a side-edge section 13e to be disposed close to a lid section 22, and the surface of the side-edge section 13e of the negative electrode current collector 13a is exposed.

Figure 6:
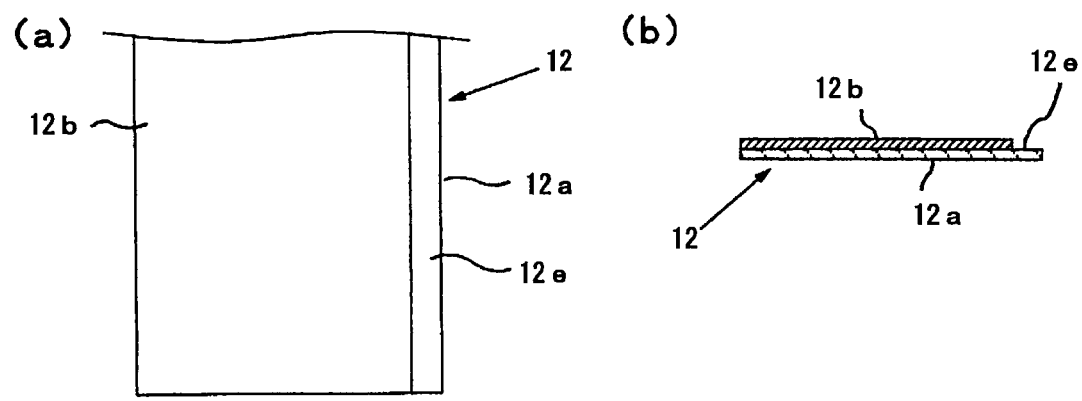
FIG. 6 is a set of enlarged explanatory diagrams illustrating part of a positive electrode sheet, FIG. 6(a) being a plan view, FIG. 6(b) being a cross-sectional view obtained by cutting the positive electrode sheet in its width direction.

As shown in FIG. 6, the positive electrode sheet 12 is obtained by forming an electrode layer 12b containing a positive electrode active material on at least one surface of a band-shaped positive electrode current collector 12a.

In the example shown, the electrode layer 12b is formed so as to cover the surface of the positive electrode current collector 12a except for a side-edge section 12e to be disposed close to a bottom section 23, and the surface of the side-edge section 12e of the positive electrode current collector 12a is exposed.

In the electrode stack 10A, the positive electrode sheet 12 is stacked on the separator-forming portion of the first porous sheet 14 such that the side-edge section 12e of the positive electrode current collector 12a protrudes from the other edge of the first porous sheet 14. The negative electrode sheet 13 is stacked on the second porous sheet 15 such that the side-edge section 13e of the negative electrode current collector 13a protrudes from one edge of the second porous sheet 15.

In the capacitor element unit 10, the side-edge section 12e of the positive electrode current collector 12a that protrudes from the other edge of the first porous sheet 14 protrudes from the other end (the lower end in FIG. 1) of the capacitor element unit 10 and is bent inward. The side-edge section 13e of the negative electrode current collector 13a that protrudes from the one edge of the second porous sheet 15 protrudes from one end (the upper end in FIG. 1) of the capacitor element unit 10 and is bent inward.

(Current Collectors)

The positive electrode current collector 12a and the negative electrode current collector 13a (hereinafter may be referred to as "electrode current collectors") are formed of a porous material having pores that penetrate its front and back surfaces.

Examples of the form of the porous material making up the electrode current collectors include an expanded metal, a punched metal, a metal mesh, a foam, and a porous foil having through-holes formed by etching or electrolytic etching.

The shape of the pores in the electrode current collectors may be set to any of a circular shape, a rectangular shape, and other suitable shapes.

The thickness of the electrode current collectors is preferably 1 to 50 μm, from the viewpoints of strength and a reduction in weight.

The porosity of the electrode current collectors is generally 10 to 79%, preferably 20 to 60%.

The porosity is computed using a following formula (3).

Porosity [%][1−(mass of electrode current collector/true specific gravity of electrode current collector)/(apparent volume of electrode current collector)]×100     Formula (3):

When such a porous material is used for the electrode current collectors, lithium ions released from the lithium ion supply sources 16 and 17 pass through the pores in the electrode current collectors and move freely between the electrodes, so that the electrode layer 12b in the positive electrode sheet 12 and/or the electrode layer 13b in the negative electrode sheet 13 can be doped with the lithium ions.

Various materials generally used for applications such as organic electrolyte batteries may be used as the material of the electrode current collectors.

Specific examples of the material of the negative electrode current collector 13a include stainless steel, copper, and nickel. Specific examples of the material of the positive electrode current collector 12a include aluminum and stainless steel.

(Electrode Layer in Negative Electrode Sheet)
(Negative Electrode Active Material)

The electrode layer 13b in the negative electrode sheet 13 contains a negative electrode active material that can reversibly support lithium ions.

For example, any of graphite, non-graphitizable carbon, a polyacene-based organic semiconductor (hereinafter may be referred to as "PAS") which is a heat-treated product of an aromatic condensed polymer and has a polyacene skeleton structure with an atomic ratio of hydrogen atoms/carbon atoms (hereinafter referred to as "H/C") of 0.05 to 1, etc. can be preferably used as the negative electrode active material making up the electrode layer 13b.

Preferably, in the present invention, the negative electrode active material has a pore diameter of not smaller than 3 nm and a pore volume of not lower than 0.10 mL/g. No limitation is imposed on the upper limit of the pore diameter, and the pore diameter is generally in the range of 3 to 50 nm.

The range of the pore volume is generally 0.10 to 0.5 mL/g, preferably 0.15 to 0.5 mL/g.

(Formation of Electrode Layer in Negative Electrode Sheet)

The electrode layer 13b in the negative electrode sheet 13 is formed on the negative electrode current collector 13a using a material containing the negative electrode active material such as any of the above carbonaceous materials and PAS. No limitation is imposed on a method of forming the electrode layer 13b, and any publicly known method can be used.

More specifically, the electrode layer 13b can be formed as follows. A slurry is prepared by dispersing a negative electrode active material powder, a binder, and an optional conductive assistant in an aqueous medium or an organic solvent. Then the slurry is applied to the surface of the negative electrode current collector 13a and dried. Alternatively, the slurry is formed into a sheet in advance, and the formed sheet is applied to the surface of the negative electrode current collector 13a.

(Binder)

Examples of the binder used to prepare the slurry include: rubber-based binders such as styrene-butadiene rubber (SBR); acrylic-based binders; fluorine-based resins such as polyethylene tetrafluoride and polyvinylidene fluoride; and thermoplastic resins such as polypropylene and polyethylene. Of these, a fluorine-based resin is preferred as the binder, and a fluorine-based resin having an atomic ratio of fluorine atoms/carbon atoms (hereinafter referred to as "F/C") of not lower than 0.75 and lower than 1.5 is particularly preferably used. A fluorine-based resin having an F/C of not lower than 0.75 and lower than 1.3 is more preferred.

The amount of the binder used varies depending on the type of the negative electrode active material, the shape of the electrode, etc. and is 1 to 20% by mass, preferably 2 to 10% by mass based on the amount of the negative electrode active material.

(Conductive Assistant)

Examples of the conductive assistant optionally used include acetylene black, Ketjen Black, graphite, and metal powders.

The amount of the conductive assistant used varies depending on the electric conductivity of the negative electrode active material, the shape of the electrode, etc. and is preferably 2 to 40% by mass based on the amount of the negative electrode active material.

The thickness of the electrode layer 13b in the negative electrode sheet 13 is designed according to the balance with the thickness of the electrode layer 12b in the positive electrode sheet 12 so that a sufficient energy density is ensured in an obtained wound-type LIC. From the viewpoints of the power density and energy density of the obtained wound-type LIC, industrial productivity, etc., the thickness of the electrode layer 13b is generally 15 to 100 μm, preferably 20 to 80 μm when it is formed on one side of the negative electrode current collector 13a.

(Electrode Layer in Positive Electrode Sheet)

The electrode layer 12b in the positive electrode sheet 12 contains a positive electrode active material that can reversibly support lithium ions and/or anions such as tetrafluoroborate.

For example, any of activated carbon, conductive polymers, a PAS which is a heat-treated product of an aromatic condensed polymer and has a polyacene skeleton structure with an H/C of 0.05 to 1, etc. can be used as the positive electrode active material making up the electrode layer 12b.

The electrode layer 12b in the positive electrode sheet 12 can be formed by the same method as that for the electrode layer 13b in the negative electrode sheet 13.

The thickness of the electrode layer 12b in the positive electrode sheet 12 is designed according to the balance with the thickness of the electrode layer 13b in the negative electrode sheet 13 so that a sufficient energy density is ensured in the obtained wound-type LIC. From the viewpoints of the power density and energy density of the obtained wound-type LIC, industrial productivity, etc., the thickness of the electrode layer 12b is generally 40 to 80 μm, preferably 50 to 70 μm when it is formed on one side of the positive electrode current collector 12a.

(Separators)

Each of the porous sheets making up the separators may be any porous sheet that is durable against the electrolyte solution, the positive electrode active material, or the negative electrode active material, includes communication pores capable of being impregnated with the electrolyte solution, and has low electric conduction.

Among the porous sheets making up the separators in the example shown, the second porous sheet 15 is a member used mainly to form one of the separators. The first porous sheet 14 is a member used to form both the other separator and the porous layer 40, as described above.

Any of cellulose (paper), rayon, polyethylene, polypropylene, and other publicly known materials can be used as the material of the porous sheets making up the separators. Of these, a mixture of cellulose and rayon, specifically a cellulose/rayon mixed nonwoven fabric, is preferred in terms of durability and economy.

No particular limitation is imposed on the thickness of the porous sheets making up the separators. The thickness is generally preferably about 20 to about 50 μm.

(Lithium Ion Supply Sources)

Figure 7:
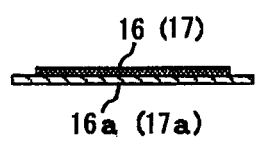
FIG. 7 is an explanatory cross-sectional view illustrating a lithium ion supply source making up the lithium ion capacitor element having the porous layer formed on its outer surface and shown in FIG. 2.

Preferably, the lithium ion supply sources 16 and 17 are compression-bonded to or stacked on metal-made current collectors (hereinafter may be referred to as lithium electrode current collectors) 16a and 17a, respectively, as shown in FIG. 7.

In such a configuration, by providing lithium electrode terminals (not shown) on the lithium electrode current collectors 16a and 17a or by disposing the lithium electrode current collectors 16a and 17a such that their side edges protrude from the respective side edges of the first porous sheet 14 and the second porous sheet 15, the lithium electrode current collectors 16a and 17a can be electrically connected to a negative electrode terminal 35.

Preferably, the lithium electrode current collectors 16a and 17a used are current collectors having a porous structure similar to that of the electrode current collectors so that the metallic lithium making up the lithium ion supply sources 16 and 17 is easily vapor-deposited or compression-bonded to the lithium electrode current collectors 16a and 17a and that, if necessary, lithium ions pass therethrough. The material used for the lithium electrode current collectors 16a and 17a is preferably, for example, stainless steel that does not react with the lithium ion supply sources 16 and 17, particularly preferably the same material as that for the negative electrode current collector. One of the lithium ion supply sources is disposed in a porous layer portion. Therefore, when current collectors having a porous structure are used as the lithium electrode current collectors 16a and 17a, one of the lithium electrode current collectors that supports the lithium ion supply source disposed in the porous layer portion can be used also as a component of the porous layer 40.

When a conductive porous material such as a stainless mesh is used for each of the lithium electrode current collectors 16a and 17a, it is preferable that at least part of the metallic lithium making up the lithium ion supply sources 16 and 17, particularly not less than 80% by mass of the metallic lithium, is embedded in the pores in the lithium electrode current collectors 16a and 17a.

The thickness of the lithium electrode current collectors 16a and 17a is preferably about 10 to about 200 μm.

The thickness of the metallic lithium compression-bonded to the lithium electrode current collectors 16a and 17a is determined in consideration of the amount of lithium ions supported by the negative electrode sheet 13 and/or the positive electrode sheet 12 in advance and is generally preferably about 100 to about 300 μm.

Preferably, the amounts of the metallic lithium making up the lithium ion supply sources 16 and 17 are set such that the positive electrode sheet 12 and/or the negative electrode sheet 13 is doped with lithium ions in an amount that allows the potential of the positive electrode sheet 12 to become not more than 2.0 V when a short circuit occurs between the positive electrode sheet 12 and the negative electrode sheet 13.

(Tapes)

No particular limitation is imposed on the material of the bases of the tapes 18 so long as the material is durable against the electrolyte solution and has no adverse effect on the obtained wound-type LIC.

Preferably, the tapes 18 have a thickness of about 25 to about 100 μm and a width of about 5 to about 10 mm because the capacitor element unit 10 can be stably held and the workability is improved.

The tapes 18 may be wound at least one turn around the capacitor element unit 10 or may be wound less than one turn around the capacitor element unit 10.

(Outer Container: Outer Housing Mechanism)

The metal-made outer container 20 making up the wound-type LIC has a configuration in which the disk-shaped lid section 22 and the disk-shaped bottom section 23 are formed integrally with the opposite ends of a cylindrical circumferential wall section 21.

The term "integrally" is used to include integration through a joint formed by, for example, welding.

In the example shown, the bottom section 23 is formed integrally with the other end of the circumferential wall section 21 by integral molding so as to be continuous therewith, and the lid section 22 is welded to and formed integrally with the circumferential edge at one end of the circumferential wall section 21.

In the outer container 20, the capacitor element unit 10 is disposed in the axial direction of the outer container 20 within a container space formed by the circumferential wall section 21, the lid section 22, and the bottom section 23 such that the other end of the capacitor element unit 10, i.e., the side-edge section 12e of the positive electrode current collector 12a, is located toward the bottom section 23 and that the one end of the capacitor element unit 10, i.e., the side-edge section 13e of the negative electrode current collector 13a, is located toward the lid section 22. In addition, the outer container 20 is filled with an electrolyte solution including an aprotic organic solvent electrolyte solution of a lithium salt.

A positive electrode terminal 30 including a concave member 31 and a convex member 32 and a negative electrode terminal 35 including a concave member 36 and a convex member 37 are disposed on the lid section 22 of the outer container 20 so as to protrude from the outer surface of the lid section 22 and to be spaced apart from each other. A safety valve (not shown) is formed at the central portion of the lid section 22 between the positive electrode terminal 30 and the negative electrode terminal 35.

More specifically, the positive electrode terminal 30 is disposed while secured to the lid section 22 by welding and electrically connected thereto. The negative electrode terminal 35 extends so as to pass through the lid section 22 in its thickness direction. A gasket 38 formed of an insulating material is disposed between the negative electrode terminal 35 and the lid section 22 at a portion in which the negative electrode terminal 35 passes through the lid section 22, and the negative electrode terminal 35 is thereby electrically insulated from the lid section 22.

No particular limitation is imposed on the metal making up the outer container 20, and a metal material such as iron or aluminum can be used. From the viewpoint of a reduction in weight of the obtained wound-type LIC, aluminum is preferred.

The dimensions of the outer container 20 are set according to the dimensions of the capacitor element unit 10 disposed thereinside. For example, the full length of the outer container 20 is 120 to 150 mm, and its inner diameter is 30 to 60 mm. The wall thickness of the outer container 20 is, for example, 0.3 to 1.2 mm, preferably 0.4 to 0.8 mm.

A terminal made of aluminum can be preferably used as the positive electrode terminal 30. A terminal produced by plating the surface of a copper base with nickel can be preferably used as the negative electrode terminal 35.

The outer diameters of the positive electrode terminal 30 and the negative electrode terminal 35 are, for example, 5 to 12 mm.

The heights of the positive electrode terminal 30 and the negative electrode terminal 35 protruding from the lid section 22 are, for example, 5 to 30 mm.

The positive electrode terminal 30 and the negative electrode terminal 35 disposed on the lid section 22 of the outer container 20 are electrically connected to the capacitor element unit 10 through a structure shown in FIG. 1.

More specifically, a disk-shaped negative electrode current collector plate 26 made of a metal is disposed at the one end of the capacitor element unit 10. The negative electrode current collector plate 26 is welded to the side-edge section 13e of the negative electrode current collector 13a by heat radiation welding (e.g., laser welding), ultrasonic welding, or resistance welding and thereby electrically connected to the side-edge section 13e while insulated from the outer container 20 through an insulating member 27 formed of an insulating resin. A negative electrode lead wire 28 is electrically connected to the negative electrode current collector plate 26 and also electrically connected to the negative electrode terminal 35. In this manner, the negative electrode terminal 35 is electrically connected to the side-edge section 13e of the negative electrode current collector 13a through the negative electrode current collector plate 26 and the negative electrode lead wire 28.

A disk-shaped positive electrode current collector plate 25 made of a metal is disposed at the other end of the capacitor element unit 10 in such a manner that the positive electrode current collector plate 25 is welded to the side-edge section 12e of the positive electrode current collector 12a by heat radiation welding (e.g., laser welding), ultrasonic welding, or resistance welding and thereby electrically connected to the side-edge section 12e. The positive electrode current collector plate 25 is also welded to the inner surface of the bottom section 23 of the outer container 20 by heat radiation welding (e.g., laser welding), ultrasonic welding, or resistance welding and thereby electrically connected to this inner surface. In this manner, the positive electrode terminal 30 is electrically connected to the side-edge section 12e of the positive electrode current collector 12a through the positive electrode current collector plate 25 and the outer container 20.

A current collector plate made of aluminum can be used as the positive electrode current collector plate 25, and a current collector plate formed by plating the surface of a copper base with nickel can be used as the negative electrode current collector plate 26.

The thicknesses of the positive electrode current collector plate 25 and the negative electrode current collector plate 26 are, for example, 0.4 to 1.0 mm.

(Electrolyte Solution)

The outer container 20 is filled with an electrolyte solution including an aprotic organic solvent electrolyte solution of a lithium salt.

The lithium salt making up the electrolyte may be any lithium salt so long as it can transfer lithium ions, does not undergo electrolysis even under a high voltage, and allows the lithium ions to be present stably therein, and specific examples of the lithium salt include $LiClO_4$, $LiAsF_6$, $LiBF_4$, $LiPF_6$, and $Li(C_2F_5SO_2)_2N$.

Examples of the aprotic organic solvent include ethylene carbonate, propylene carbonate, dimethyl carbonate, diethyl carbonate, γ-butyrolactone, acetonitrile, dimethoxyethane, tetrahydrofuran, dioxolane, methylene chloride, and sulfolane. These aprotic organic solvents may be used either singly or in any combination thereof.

The electrolyte solution is prepared by mixing the above-described electrolyte and solvent in a sufficiently dehydrated state. The concentration of the electrolyte in the electrolytic solution is preferably at least 0.1 mol/L, more preferably 0.5 to 1.5 mol/L, in order to reduce internal resistance due to the electrolytic solution.

The wound-type LIC having the above configuration is obtained by inserting the capacitor element unit 10 into the outer container 20 and filling the outer container 20 with the electrolyte solution.

In the thus-produced wound-type LIC, the outer container 20 is filled with the electrolytic solution capable of transferring lithium ions. Therefore, after the wound-type LIC is left to stand for an appropriate time, the negative electrode sheet 13 and/or the positive electrode sheet 12 comes into electrochemical contact with the lithium ion supply sources 16 and 17 and is thereby doped with lithium ions released from the lithium ion supply sources 16 and 17.

The electrode stack 10A is wound with the lithium ion supply sources 16 and 17 disposed between the first porous sheet 14 and the second porous sheet 15 in advance. This allows the production of the capacitor element unit 10 and the installation of the lithium ion supply sources 16 and 17 to be performed in a single step, and higher productivity can thereby be obtained.

In the wound-type LIC having the above configuration, the porous layer 40 is formed on the outer surface of the element 11, and the thickness T of the porous layer 40 is determined according to the relation between the capacitance C and direct current resistance value R of the wound-type LIC. Therefore, even when an internal short circuit occurs, the thermal energy caused by abrupt heat generation due of the flow of a large current is absorbed by the electrolyte solution with which the porous layer 40 is impregnated. This can suppress an increase in the surface temperature of the outer container 20. In addition, the porous layer 40 can be disposed without causing problems such as a reduction in the capacitance of the wound-type LIC and an increase in its resistance.

Therefore, with the wound-type LIC, high capacity and high output characteristics are obtained, and an increase in the surface temperature when an internal short circuit occurs is suppressed. High safety is thereby achieved.

In the wound-type LIC, since the porous layer 40 is formed from the first porous sheet 14 that also forms one of the separators, the formation of the element portion (the element 11) and the formation of the porous portion (the porous layer 40) can be performed in a single step, and the production of the wound-type LIC is thereby facilitated.

In addition, the wound-type LIC can be preferably used to configure an accumulator device (module) including a plurality of lithium ion capacitors. In such an accumulator device, even when an internal short circuit occurs in one of the plurality of lithium ion capacitors, an increase in the surface temperature of the lithium ion capacitor in which the internal short circuit has occurred is suppressed. Therefore, the influence of the heat is prevented from being exerted on adjacent lithium ion capacitors.

Although the embodiment of the present invention has been described, the above embodiment is not a limitation, and various modification can be made.

For example, the porous layer may be formed from a plurality of members making up the separators of the lithium ion capacitor element (e.g., the first porous sheet 14 and the second porous sheet 15 in the wound-type LIC shown in FIGS. 1 to 7), may be formed from only one of the plurality of members making up the separators, or may be formed from part of a member.

The porous layer may be formed from a member different from the members making up the separators of the lithium ion capacitor element, i.e., from a dedicated member.

The lithium ion capacitor may be of the so-called stacked type in which the lithium ion capacitor element is formed by stacking a plurality of positive electrode sheets and negative electrode sheets alternately through separators. The lithium ion capacitor may have a structure in which the outer container is formed from laminates of stacked outer films that are hermetically joined to each other at connection portions formed at the respective outer circumferential edges.

Examples of the present invention will next be described specifically, but the present invention is not limited to these Examples.

Example 1

An element and a porous layer were produced as follows on the basis of the configuration in FIGS. 2 to 7.

(1) Production of Negative Electrode Sheet

A phenolic resin molded plate with a thickness of 0.5 mm was placed in a siliconit electric furnace, heated to 500° C. at a rate of 50° C./hour in a nitrogen atmosphere, and then heated to 660° C. at a rate of 10° C./hour to perform heat treatment, and a PAS plate was thereby produced. The obtained PAS plate was pulverized using a disk mill to prepare a PAS powder. The H/C of the PAS powder was 0.8.

Then 100 parts by mass of the prepared PAS powder and 10 parts by mass of polyvinylidene fluoride powder were added to 80 parts by mass of N-methylpyrrolidone and dissolved and dispersed therein to prepare a negative electrode slurry. Opposite surfaces of a negative electrode current collector formed from a copper expanded metal (manufactured by NIPPON METAL INDUSTRY Co., Ltd.) having a thickness of 32 μm and a porosity of 50% were intermittently coated with the negative electrode slurry using a die coater, and the slurry was dried. The obtained coatings were subjected to press work to form electrode layers having a length of 280.0 cm and a width of 11.7 cm. Then the negative electrode current collector was cut to produce a negative electrode sheet including the negative electrode current collector having a length of 280.0 cm and a width of 12.7 cm and the electrode layers formed on the opposite surfaces of the negative electrode current collector and having a length of 280.0 cm and a width of 11.7 cm. The negative electrode sheet has 10 mm-wide side-edge portions in which no electrode layer was formed on the negative electrode current collector.

The thickness of the obtained negative electrode sheet (the total thickness of the negative electrode current collector and the electrode layers formed on its opposite surfaces) was 80 μm.

(2) Production of Positive Electrode Sheet

100 Parts by mass of activated carbon powder with a specific surface area of 1,950 $m^2$/g, 10 parts by mass of acetylene black, 6 parts by mass of an acrylic binder, and 4 parts by mass of carboxymethyl cellulose were added to water and dispersed therein to prepare a positive electrode slurry.

Opposite surfaces of a positive electrode current collector formed from an aluminum expanded metal (manufactured by NIPPON METAL INDUSTRY Co., Ltd.) having a thickness of 35 μm and a porosity of 50% were intermittently coated with a non-aqueous carbon-based conductive coating (EB-815, manufactured by Acheson (Japan) Ltd.) using a die coater, and the conductive coating is dried to form primer layers having a length of 260 cm and a width of 11.2 cm. The total thickness of the positive electrode current collector and the primer layers formed on its opposite surfaces was 52 μm, and the pores in the positive electrode current collector were clogged with the primer layers.

Next, the surfaces of the primer layers formed on the positive electrode current collector were intermittently coated with the prepared positive electrode slurry using a die coater, and the slurry was dried. The obtained coatings were subjected to press work to form electrode layers having a length of 260.0 cm and a width of 11.2 cm. The positive electrode current collector was cut to produce a positive electrode sheet including the positive electrode current collector having a length of 260.0 cm and a width of 12.2 cm and the electrode layers formed on the opposite surfaces of the positive electrode current collector and having a length of 260.0 cm and a width of 11.2 cm. The positive electrode sheet has 10 mm-wide side-edge portions in which no electrode layer was formed on the positive electrode current collector.

The thickness of the obtained positive electrode sheet (the total thickness of the positive electrode current collector and the primer and electrode layers formed on its opposite surfaces) was 210 μm.

(3) Production of Element and Porous Layer

A first porous sheet and a second porous sheet each formed from a cellulose/rayon mixed nonwoven fabric having a length of 340.0 cm, a width of 13.5 cm, and a thickness of 30 μm were prepared as porous sheets for forming separators.

A lithium ion supply source formed from a metallic lithium foil having a length of 5 cm, a width of 10.0 cm, and a thickness of 170 μm was placed on the back surface of a one-end section of the prepared first porous sheet and secured thereto by compression bonding, and a lithium electrode current collector formed from a copper expanded metal having a length of 5 cm, a width of 12.7 cm, a thickness of 32 μm, and a porosity of 50% was placed on the lithium ion supply source and secured thereto by compression bonding. A lithium ion supply source formed from a metallic lithium foil having a length of 38 cm, a width of 10.0 cm, and a thickness of 170 μm was placed on the back surface of the other-end section of the first porous sheet and then secured thereto by compression bonding, and a lithium electrode current collector formed from a copper expanded metal having a length of 38 cm, a width of 12.7 cm, a thickness of 32 μm, and a porosity of 50% was placed on the lithium ion supply source and then secured thereto by compression bonding. Then the positive electrode sheet was disposed between the two lithium ion supply sources disposed on the surface of the first porous sheet such that the side edge portion of the positive electrode current collector protruded from the other side edge of the first porous sheet. Then the second porous sheet was stacked on the positive electrode sheet such that the side edge portion of the positive electrode current collector protruded from the other side edge of the second porous sheet, and the negative electrode sheet was stacked on the second porous sheet such that the side edge portion of the negative electrode current collector protruded from one side edge of the second porous sheet to thereby form an electrode stack. The positive electrode sheet and the negative electrode sheet were disposed such that one of the electrode layers formed on the opposite surfaces of the positive electrode sheet faced one of the electrode layers formed on the opposite surfaces of the negative electrode sheet through the second porous sheet.

This electrode stack was wound from its one end around a stainless steel-made core rod having a diameter of 8 mm such that the negative electrode sheet was disposed inward to thereby form an element having an inner diameter of 8 mm and an outer diameter of 38 mm. Then a porous sheet for forming a porous layer formed of the same material as that of the first porous sheet was wound many turns around the outer circumferential surface of the element to thereby form a 180 μm-thick porous layer as a wound stack, and an element having the porous layer formed on the outer surface thereof (a capacitor element unit) was thereby produced. Two tapes formed of polypropylene, having length and width dimensions of 5.0 cm×1.0 cm and a thickness of 35 μm, and each including an adhesive layer on one side were provided on the outer circumferential surface of the capacitor element unit to hold the capacitor element unit.

The side edge portion of the negative electrode current collector in the obtained element was folded inward, and a nickel-plated disk-shaped copper negative electrode current collector plate having a diameter of 35 mm and a thickness of 0.4 mm was resistance-welded to the side edge portion of the negative electrode current collector and electrically connected thereto. Then a nickel-plated copper negative electrode lead wire having a length of 20 mm, a width of 15 mm, and a thickness of 0.4 mm was laser-welded to the negative electrode current collector plate and electrically connected thereto, and an insulating member formed of polypropylene was disposed on the negative electrode current collector plate to insulate it from the outer container.

The other side edge portion of the positive electrode current collector was folded inward, and an aluminum-made positive electrode current collector plate having a diameter of 35 mm and a thickness of 0.4 mm was resistance-welded to the side edge portion of the positive electrode current collector and electrically connected thereto.

(4) Production of Wound LIC

A closed-end cylindrical outer container member made of aluminum and having an outer diameter of 40 mm, an inner diameter of 39.2 mm (wall thickness: 0.4 mm), and a full length of 140 mm was prepared. Then the capacitor element unit including the positive electrode current collector plate and the negative electrode current collector plate was disposed in the outer container member, and the positive electrode current collector plate was ultrasonic-welded to the inner bottom surface of the outer container member and electrically connected thereto.

An electrolyte solution inlet and a through-hole for installing an electrode terminal were formed in a disk-shaped lid member formed of aluminum and having a diameter of 40 mm and a thickness of 1.2 mm. A concave member including a copper base with its surface plated with nickel and having an outer diameter of 10 mm and a length of 15 mm was inserted into the through-hole of the lid member, and a convex member including a copper base with its surface plated with nickel was fitted into the concave member. A negative electrode terminal was thereby disposed protruding from one surface of the lid member. The negative electrode terminal was secured through a gasket formed of polyphenylene sulfide so as to be insulated from the lid member. A positive electrode terminal prepared by fitting a convex member including a copper base having an aluminum-coated surface into an aluminum-made concave member having an outer diameter of 10 mm and a length of 15 mm was disposed on the surface of the lid member so as to protrude from the surface of the lid member. The base end of the positive electrode terminal was resistance-welded to the lid member, secured thereto, and electrically connected thereto.

Then the negative electrode lead wire welded to the negative electrode current collector plate was laser-welded to the base end of the negative electrode terminal and electrically connected thereto, and the lid member was welded to the outer container member and integrated therewith to form a lid section. Then an electrolyte solution prepared by dissolving $LiPF_6$ in propylene carbonate at a concentration of 1 mol/L was introduced from the electrolyte solution inlet formed on the lid section, and the electrolyte solution inlet was covered with an electrolyte solution inlet lid. A wound-type LIC in which the capacitor element unit and the electrolyte solution were housed in the outer container as show in FIG. 1 (hereinafter may be referred to as a wound-type LIC (1)) was thereby produced.

The capacitance of the obtained wound-type LIC (1) was 3.5 [kF].

(5) Measurement of Direct Current Resistance

The electric resistance value (direct current resistance value (DC-IR)) across the lid and bottom of the outer container of the obtained wound-type LIC (1) was measured using a resistance measuring apparatus (manufactured by HIOKI E. E. CORPORATION) and found to be 1 [mΩ].

(6) Nail Penetration Test Measurement

A nail penetration test was performed on the obtained wound-type LIC (1) under the following conditions. More specifically, the wound-type LIC (1) was placed such that the tube axis of the outer container was horizontally directed. A nail was inserted vertically from above into the outer container at a position 70 mm away from the bottom section of the outer container in a direction from the bottom section to the lid section. Immediately after the insertion of the nail, the surface temperature at a position 60 mm away from the nail insertion point in a direction toward the bottom section (a position 10 mm away from the bottom section of the outer container in the direction from the bottom section to the lid section) was measured and found to be 84° C.

[Nail Penetration Test Conditions]
Nail diameter: φ2.5
Nail insertion rate: 1 mm/s
Voltage at start of test: 3.8 V
Temperature measuring device: thermocouple Example 2

A wound-type LIC (hereinafter may be referred to as a "wound-type LIC (2)") was produced as in Example 1 except that the length of the negative electrode current collector was changed to 510.0 cm, the length of the positive electrode current collector was changed to 480.0 cm, the thicknesses of the electrode layers were adjusted such that the total thickness of the positive electrode current collector and the electrode layers formed on the opposite surfaces thereof was 100 μm, the lengths of the first porous sheet and the second porous sheet were changed to 534.0 cm, and the thickness of the porous layer was changed to 120 μm.

The capacitance and direct current resistance value of the obtained wound-type LIC (2) were measured by the same methods as those in Example 1, and nail penetration test measurement was performed using the same method as that in Example 1. The results are shown in TABLE 1.

Example 3

A wound-type LIC (hereinafter may be referred to as a "wound-type LIC (3)") was produced as in Example 2 except that the lengths of the first porous sheet and the second porous sheet were changed to 546.0 cm and the thickness of the porous layer was changed to 180 μm.

The capacitance and direct current resistance value of the obtained wound-type LIC (3) were measured by the same methods as those in Example 1, and nail penetration test measurement was performed using the same method as that in Example 1. The results are shown in TABLE 1.

Example 4

A wound-type LIC (hereinafter may be referred to as a "wound-type LIC (4)") was produced as in Example 1 except that the length of the negative electrode current collector was changed to 550.0 cm, the length of the positive electrode current collector was changed to 520.0 cm, the thicknesses of the electrode layers were adjusted such that the total thickness of the positive electrode current collector and the electrode layers formed on the opposite surfaces thereof was 100 μm, the lengths of the first porous sheet and the second porous sheet were changed to 586.0 cm, and the thickness of the porous layer was changed to 120 μm.

The capacitance and direct current resistance value of the obtained wound-type LIC (4) were measured by the same methods as those in Example 1, and nail penetration test measurement was performed using the same method as that in Example 1. The results are shown in TABLE 1.

Comparative Example 1

A comparative wound-type LIC (hereinafter may be referred to as a "comparative wound-type LIC (1)") was produced as in Example 1 except that the lengths of the first porous sheet and the second porous sheet were changed to 316.0 cm and the thickness of the porous layer was changed to 60 μm.

The capacitance and direct current resistance value of the obtained comparative wound-type LIC (1) were measured by the same methods as those in Example 1, and nail penetration test measurement was performed using the same method as that in Example 1. The results are shown in TABLE 1.

Comparative Example 2

A comparative wound-type LIC (hereinafter may be referred to as a "comparative wound-type LIC (2)") was produced as in Example 1 except that the lengths of the first porous sheet and the second porous sheet were changed to 328.0 cm and the thickness of the porous layer was changed to 120 μm.

The capacitance and direct current resistance value of the obtained comparative wound-type LIC (2) were measured by the same methods as those in Example 1, and nail penetration test measurement was performed using the same method as that in Example 1. The results are shown in TABLE 1.

Comparative Example 3

A comparative wound-type LIC (hereinafter may be referred to as a "comparative wound-type LIC (3)") was produced as in Example 2 except that the lengths of the first porous sheet and the second porous sheet were changed to 522.0 cm and the thickness of the porous layer was changed to 60 μm.

The capacitance and direct current resistance value of the obtained comparative wound-type LIC (3) were measured by the same methods as those in Example 1, and nail penetration test measurement was performed using the same method as that in Example 1. The results are shown in TABLE 1.

Comparative Example 4

A comparative wound-type LIC (hereinafter may be referred to as a "comparative wound-type LIC (4)") was produced as in Example 4 except that the lengths of the first porous sheet and the second porous sheet were changed to 562.0 cm, the thicknesses of these porous sheets were changed to 40 μm, and the thickness of the porous layer was changed to 40 μm.

The capacitance and direct current resistance value of the obtained comparative wound-type LIC (4) were measured by the same methods as those in Example 1, and nail penetration test measurement was performed using the same method as that in Example 1. The results are shown in TABLE 1.

Comparative Example 5

A comparative wound-type LIC (hereinafter may be referred to as a "comparative wound-type LIC (5)") was produced as in Example 4 except that the lengths of the first porous sheet and the second porous sheet were changed to 574.0 cm, and the thickness of the porous layer was changed to 80 μm.

The capacitance and direct current resistance value of the obtained comparative wound-type LIC (5) were measured by the same methods as those in Example 1, and nail penetration test measurement was performed using the same method as that in Example 1. The results are shown in TABLE 1.

Comparative Example 6

A comparative stacked-type lithium ion capacitor (hereinafter may be referred to as a "comparative stacked-type LIC (6))" was produced as described later. The obtained comparative stacked-type LIC was charged at a constant current of 1.5 A until the cell voltage reached 3.8 V. Then a 3.8 V-2.2 V cycle was repeated in which constant current-constant voltage charging was performed at an applied constant voltage of 3.8 V for 1 hour and then discharging was performed at a constant current of 1.5 A until the cell voltage reached 2.2 V. A cell capacitance (the capacitance of the lithium ion capacitor) and an internal resistance (the direct current resistance value of the lithium ion capacitor) were measured after the tenth discharging. In addition, nail penetration test measurement was performed using the same method as that in Example 1. The results are shown in TABLE 1.

(1) Production of Negative Electrode Sheets

The same procedure as in (1) production of the negative electrode sheet in Example 1 was repeated to form electrode layers on opposite surfaces of negative electrode current collectors. The resultant negative electrode current collectors were cut such that their length and width dimensions were 6.0 cm×7.5 cm (excluding a terminal-welding portion) to thereby produce negative electrode sheets.

(2) Production of Positive Electrode Sheets

85 Parts by mass of activated carbon powder with a specific surface area of 2,000 m$^2$/g, 5 parts by mass of acetylene black powder, 6 parts by mass of an acrylic resin binder, 4 parts by mass of carboxymethyl cellulose, and 200 parts by mass of water were mixed to prepare a positive electrode slurry.

Opposite surfaces of positive electrode current collectors each formed from a 35 μm-thick aluminum-made expanded metal (porosity of 50%) (manufactured by NIPPON METAL INDUSTRY Co., Ltd.) were spray-coated with a non-aqueous carbon-based conductive coating (EB-815, manufactured by Acheson (Japan) Ltd.), and the coating was dried to form conductive layers. The total thickness of each positive electrode current collector and the conductive layers formed on the opposite surfaces thereof was 52 μm, and the pores in the positive electrode current collector were substantially clogged with the conductive layers.

Then the obtained positive electrode slurry was applied to the surfaces of the conductive layers formed on the positive electrode current collectors using a roll coater and then vacuum dried to form electrode layers, and the resultant current collectors were cut such that their length and width dimensions were 5.8 cm×7.3 cm (excluding a terminal-welding portion) to produce positive electrode sheets. In each obtained positive electrode sheet, the total thickness of the positive electrode current collector, and the conductive layers and electrode layers formed on the opposite surfaces thereof was 152 μm, and the total thickness of the electrode layers was 100 μm.

(3) Production of Stacked-Type Lithium Ion Capacitor

A cellulose/rayon mixed nonwoven fabric having length and width dimensions of 6.2 cm×7.7 cm and a thickness of 35 μm was used as separators, and the positive electrode sheets and the negative electrode sheets were stacked such that the opposite outermost layers were negative electrode sheets and 40 facing layers were formed. Separators were placed on the outermost layers and secured with tapes. Then the terminal-welding portions of the positive electrode current collectors (20 current collectors) were ultrasonic-welded, and the terminal-welding portions of the negative electrode current collectors (21 current collectors) were ultrasonic-welded to thereby produce an electrode stack.

One lithium electrode prepared by compression-bonding a metal lithium foil to a stainless net having a thickness of 80 μm was placed on the lower surface of the obtained electrode stack, and another lithium electrode was placed on the upper surface thereof. Polyethylene-made plates having a thickness of 0.5 mm were placed on the lithium electrodes and secured thereto with tapes to thereby obtain a three-electrode stack unit. The three-electrode stack unit was sandwiched between an upper exterior laminate film and a lower exterior laminate film that had been subjected to drawing at their central portions, and the laminate films were heat-sealed at three edges. Then the three-electrode stack unit was impregnated with an electrolyte solution (a solution prepared by dissolving LiPF$_6$ in a solvent mixture of ethylene carbonate, diethyl carbonate, and propylene carbonate in a mass ratio of 3:4:1 at a concentration of 1 mol/L) in a vacuum. Then the remaining one edge was heat-sealed under reduced pressure to produce a comparative stacked-type lithium ion capacitor (comparative stacked-type LIC (6)).

TABLE 1

| | CAPACITANCE C [kF] | DIRECT CURRENT RESISTANCE VALUE R [mΩ] | THICKNESS T OF POROUS LAYER [μm] | T · R/C | R/C | SURFACE TEMPERATURE AFTER INSERTION OF NAIL [° C.] |
|---|---|---|---|---|---|---|
| EXAMPLE 1 | 3.5 | 1.0 | 180 | 51 | 0.29 | 84 |
| EXAMPLE 2 | 2.5 | 0.8 | 120 | 38 | 0.32 | 135 |
| EXAMPLE 3 | 2.5 | 0.8 | 180 | 58 | 0.32 | 79 |
| EXAMPLE 4 | 2.0 | 0.7 | 120 | 42 | 0.35 | 85 |
| COMPARATIVE EXAMPLE 1 | 3.5 | 1.0 | 60 | 17 | 0.29 | 327 |
| COMPARATIVE EXAMPLE 2 | 3.5 | 1.0 | 120 | 34 | 0.29 | 220 |
| COMPARATIVE EXAMPLE 3 | 2.5 | 0.8 | 60 | 19 | 0.32 | 304 |
| COMPARATIVE EXAMPLE 4 | 2.0 | 0.7 | 40 | 14 | 0.35 | 311 |
| COMPARATIVE EXAMPLE 5 | 2.0 | 0.7 | 80 | 28 | 0.35 | 282 |
| COMPARATIVE EXAMPLE 6 | 0.46 | 3.8 | (500) | 4113 | 8.23 | 61 |

For Comparative Example 6, the thickness of each polyethylene-made plate disposed on the electrode stack was entered in a "thickness T of porous layer" column in TABLE 1 and enclosed in parentheses.

As is clear from the results in TABLE 1, the lithium ion capacitors in Examples 1 to 4 were found to have a high capacitance and a low direct current resistance value. It was also found that the surface temperature after insertion of a nail was relatively low. Therefore, it is clear that the lithium ion capacitors in Examples 1 to 4 are safe lithium ion capacitors having high capacitance and low resistance.

In the lithium ion capacitors in Comparative Examples 1 to 5, the surface temperature after insertion of a nail was high, i.e., 150° C. or higher, and therefore it is clear that their safety is low. In the lithium ion capacitor in Comparative Example 6, the surface temperature after insertion of a nail was relatively low. However, it is clear that the lithium ion capacitor is a low-capacitance and high-resistance lithium ion capacitor.

REFERENCE SIGNS LIST

10 Capacitor element unit
10A Electrode stack
11 Lithium ion capacitor element (element)
12 Positive electrode sheet
12a Positive electrode current collector
12b Electrode layer
12e Side-edge section
13 Negative electrode sheet
13a Negative electrode current collector
13b Electrode layer
13e Side-edge section
14 First porous sheet
14a One-end section
14b The other-end section of the separator-forming portion (separator-end section)
14c The other-end section
15 Second porous sheet
15a One-end section
15b The other-end section
16, 17 Lithium ion supply source
16a, 17a Current collector (lithium electrode current collector)
18 Tape
20 Outer container
21 Circumferential wall section
22 Lid section
23 Bottom section
25 Positive electrode current collector plate
26 Negative electrode current collector plate
27 Insulating member
28 Negative electrode lead wire
30 Positive electrode terminal
31 Concave member
32 Convex member
35 Negative electrode terminal
36 Concave member
37 Convex member
38 Gasket
40 Porous layer

The invention claimed is:

1. A lithium ion capacitor, comprising:
   a lithium ion capacitor element formed by overlaying a positive electrode sheet and a negative electrode sheet on top of one another with a separator interposed therebetween;
   an electrolyte solution;
   a lithium ion supply source; and
   an outer container that comprises the lithium ion capacitor element and the electrolyte solution,
   wherein a porous layer is formed on an outer surface of the lithium ion capacitor element has a thickness of less than 1,000 μm,
   wherein the lithium ion capacitor satisfies expressions (1) and (2):

$$35 \leq T \times R/C \qquad (1),$$
   $$0.01 \leq R/C \leq 5 \qquad (2),$$

wherein C is a capacitance [kF] of the lithium ion capacitor, R is a direct current resistance value [mΩ] of the lithium ion capacitor, and T is a thickness [μm] of the porous layer, and
   wherein the lithium ion supply source is disposed in the lithium ion capacitor element such that the lithium ion supply source does not contact the positive electrode sheet and the negative electrode sheet.

2. The lithium ion capacitor of claim 1, wherein the porous layer is formed by overlaying porous sheets.

3. The lithium ion capacitor of claim 1, wherein the porous layer and the separator are formed from a single member.

4. The lithium ion capacitor of claim 1, wherein the porous layer comprises at least one selected from the group consisting of cellulose, rayon, polyethylene, and polypropylene.

5. The lithium ion capacitor of claim 1, wherein the porous layer has a thickness of not smaller than 120 μm.

6. The lithium ion capacitor of claim 2, wherein the porous layer and the separator are formed from a single member.

7. The lithium ion capacitor of claim 2, wherein the porous layer comprises at least one selected from the group consisting of cellulose, rayon, polyethylene, and polypropylene.

8. The lithium ion capacitor of claim 2, wherein the porous layer has a thickness of not smaller than 120 μm.

* * * * *